April 17, 1962

R. F. CAROSELLI ETAL 3,029,590

EXTENSIBLE FIBROUS GLASS TEXTILE STRAND
STRUCTURE AND METHOD OF MAKING SAME

Filed Dec. 30, 1958

REMUS F. CAROSELLI,
ALFRED MARZOCCHI &
S. MARTIN BILLETT
INVENTORS

BY *[signature]*

ATTORNEYS

3,029,590
Patented Apr. 17, 1962

3,029,590
EXTENSIBLE FIBROUS GLASS TEXTILE STRAND STRUCTURE AND METHOD OF MAKING SAME
Remus F. Caroselli and Alfred Marzocchi, Cumberland, and S. Martin Billett, Esmond, R.I., assignors to Owens-Corning Fiberglas Corporation, a corporation of Delaware
Filed Dec. 30, 1958, Ser. No. 783,783
7 Claims. (Cl. 57—153)

This invention relates to composite strand structures of two or more materials, one of which has a high modulus of elasticity, and another an extremely low modulus of elasticity. More particularly, the invention relates to textile strand structures made up of bundles of glass filaments embedded in a matrix of an elastomeric material twisted and plied with similar composite structures to form a yarn which may in turn be plied with other such structures to form cords or ropes.

Glass fibers, it is well known, have many desirable features for textile purposes, among which are inertness to deterioration of the base material, high tensile strength, and a high modulus of elasticity. For many applications, however, the latter is a limiting factor in that, for example, the high modulus will in many cases limit the adaptability of the glass fibers to special applications where extensibility is desirable. Continuous glass fibers in yarn form are limited in their extensibility usually to less than 3%, and in addition, have practically no yield point. Such lack of extensibility in many cases makes the fibers unuseable for special purposes, such as for fabrics where conformability is desirable, or for reinforcement of working materials such as rubber in tires or in V-belts for a power transmission.

According to the present invention, however, a composite structure of continuous glass fibers and rubber-like materials are combined to permit utilization of the desirable features of glass fibers, such as their tensile strength, and at the same time lend an extensibility which imparts to the composite structure a high flex strength making the glass fibers adaptable for many uses to which they heretofore have been impossible to apply.

The composite yarn structure produced according to the present invention incorporates as a matrix a low modulus material such as an elastomeric material like rubber which also acts as a protective sheath for the bundle of continuous glass fibers completely embedded within. The combination of the glass fibers with the elastomeric material, in a sense, involves a mismatching of the stress-strain characteristics of different materials, or in other words, a matching of materials having different stress-strain characteristics, so that in use, the composite structure evidences properties complementarily embodying the individual characteristics of the separate materials.

For example, yarns made of continuous glass fibers encased in a combination sheathing and impregnant of rubber-like material when subjected to forces establishing a high strain level, has a high stress produced in the glass fibers with practically negligible stress developed on the more extensible matrix material. The rubber-like matrix material distributes the tension and compression forces imparted, such as is encountered in bending, and distributes the load among a larger number of the filaments than would otherwise be experienced under corresponding conditions with non-resiliently coated glass fiber yarns. Additionally, the elastomeric matrix by preventing stress concentration in the relatively non-extensible glass fibers embodied in a strand, yarn, or cord, improves the resistance to changing loads such as occur during extension, bending, compression, and shear. Improvement in characteristics in this respect resolve themselves in even more important properties of improved fatigue, flex, and wear life.

The presence of a matrix of resilient material prevents a strand or yarn from being bent on itself to the degree that would be allowed if the matrix were not present. The bend radius of a composite yarn having a sheath and impregnant of rubber-like material is prevented from becoming sufficiently small to allow breakage of single filaments and can limit the minimum radius to a value greater than that which would effect a breaking of the individual filaments.

The process by which the product of the present invention is produced involves an impregnation and sheathing of a bundle of relatively untwisted continuous glass filaments with an elastomeric substance having a high degree of compressibility and extensibility, and after the impregnating and coating operation, to cure the substance in position throughout with the fibers integrally fixed in position within the matrix. After curing, the composite structure comprising the bundle of fibers in integral relation with its surrounding matrix, is twisted as a single unit into a yarn-like form, which in turn is adaptable to being plied with other similar composite structures to produce a more balanced yarn structure. A slight unbalance is provided however by effecting a slight overtwist or undertwist, which it has been found promotes provision of the desired extensibility and correspondingly imparts a greater degree of flexural strength to the plied yarn than is obtainable with a completely neutral or balanced yarn.

By combining two or more strands or yarns into plied yarns, cords, ropes, or cables, the compressibility of the matrix and coating material lowers the initial modulus and permits better load distribution among the groups of yarns or cords than is otherwise possible. As indicated, the twisting and plying of coated yarns of a composite of glass fibers and a rubber-like matrix improves the elongation, but in a more important and novel sense, the extensibility can be limited to a fixed amount. That is, because of the low extensibility of the glass fibers, stress concentration can be readily developed in them upon application of forces lengthwise of the composite structure, but in a twisting and plying structure, there is always more space between adjacent filaments in the structure containing air or compressible cushioning material that will be taken up or displaced before the applied load can be transmitted to the glass fibers so that a fixed elongation occurs in the structure before the stress build-up is imparted to the filaments. Thus, the product is elongated to a degree under increasing loads before stress is imparted to the fibers, depending upon the amount of twist and material provided for compression.

The matrix material, in addition to permitting an extensibleness to a predeterminable desired degree, also acts as protection for the usually low abrasion-resistant glass filaments and limits the inter-filament abrasion so as to impart a longer life to the composite structure than is otherwise obtainable with bare glass fiber yarns. Because of inter-filament abrasion, the flex life of bare glass fiber yarns is extremely limited. Beside being limited by high inter-filament abrasion, the flex life of bare glass fiber strands and yarns is short because of the crushing effects of localized stress concentrations and lack of means effecting stress relief.

In view of the foregoing, it is an object of the present invention to provide an extensible textile strand product made up of filaments of high modulus material such as glass in combination with a low modulus matrix of elastomeric material such as rubber in a manner so as to both impart an extensibility to the composite structure and at the same time to provide protection against abrasion for the high modulus filaments.

It is another object of the present invention to provide a textile strand structure of glass filaments in combination with a low modulus cushionable material to impart a high flexural strength and long life under high-stress working conditions such as those experienced in the reinforcement of V-belts and vehicle tires and the like.

A feature of the invention lies in provision of a textile strand structure incorporating the high tensile strength and flex characteristics of glass fibers while yet providing an extensibility in such structure making it conformable and useable for many purposes where the high modulus material alone is not adaptable to use.

Other objects and features which we believe to be characteristic of our invention are set forth with particularity in the appended claims. Our invention itself, however, in both organization and manner of construction together with further objects and advantages thereof may be best understood by reference to the following description taken in conjunction with the accompanying drawings in which:

Figure 1:
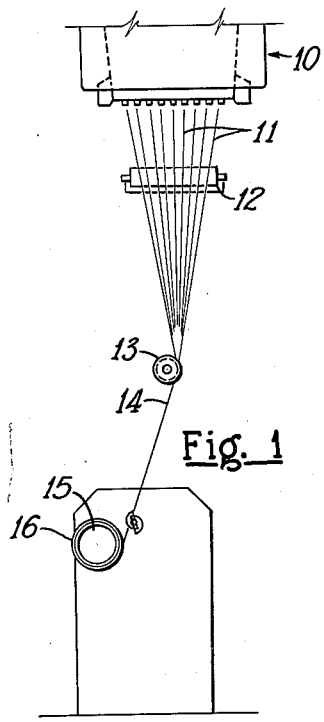
FIGURE 1 is an elevational view of apparatus for producing continuous glass filaments combined into a strand.

Referring to the drawings in greater detail, FIGURE 1 shows a source of molten glass such as a feeder 10 from which streams of molten glass are fed and attenuated into filaments 11 which are then supplied with sizing fluid applied by an applicator such as a roll-type applicator 12. The filaments are then gathered into a strand 14 by passage over a gathering member such as a graphite shoe 13. The force of attenuation of the streams into the continuous fibers or filaments 11 is provided by a winder which collects the strand 14 into a package 16 on a rotating collet 15. Upon completion of the winding cycle, the package 16 is doffed and ready for subsequent processing.

Figure 2:
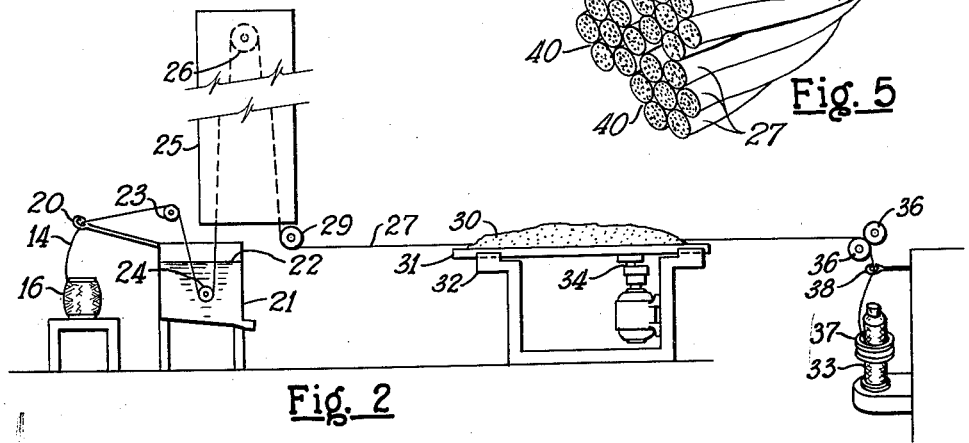
FIGURE 2 is a somewhat schematic side elevational view of an arrangement of apparatus for coating strands of continuous glass fibers and for twisting them into a composite yarn structure according to the principles of the present invention.

According to the principles of the present invention, the strand package is unwound and further processed into the form of a composite twisted yarn structure 27 and wound onto a twister package 33 as shown in FIGURE 2. The composite yarn structure of the present instance is characterized in that the continuous glass filaments are generally separated from each other by the cushionable material which forms a matrix for the resulting unitary strand-like structure as well as an outer sheath for the filaments incorporated therein.

Referring to FIGURE 2, the strand 14 of parallel filaments is withdrawn from the package 16 which is fixed in position while the strand is passed over a guide eye to a coating and impregnating bath of liquid cushioning material 22 such as a rubber latex contained in a tank 21. Although continued processing of the strand is preferably accomplished while untwisted withdrawal of the strand 14 from the package 16 while the package is stationary, one twist is provided in the strand 14 for each loop of the package 16 as the unwinding takes place. However, since standard packages of this type have a circumference in the order of 18 inches, upon withdrawal of the strand 14, only one twist is imparted thereto for each 18 inches of length. This is a sufficiently small amount of twist that for practical purposes the parallel relationship of the filaments in the strand is retained and the strand can be considered as practically untwisted.

Impregnation of the strand 14 in the bath 22 may be accomplished by first drawing it over a relatively small diameter grooves pulley 24 immersed in the bath 22, whereupon it is withdrawn as a coated strand 27 for passage through a setting oven 25. Upon passage over the relatively small pulley 23, the closely bonded relationship of the filaments 11 in the strand 14 is worked or broken down due both to tension in the strand and the relatively small radius bend imparted by the pulley which cause a flattening of the strand against the pulley 23 as well as against the pulley 24. Such action causes the filaments 11 to become separated or loosened from the integrating relation provided by the sizing material. Loosening of the filaments from this interbonded relation assures a more thorough impregnation of the cushionable bath material through the entire strand structure and a more positive assurance of a coating of each of the filaments 11 contained therein. The further working of the strand upon passage over the immersed pulley 24 further promotes the coating of each of the filaments in the resulting generally circular cross-sectioned strand 27, which upon withdrawal from the bath 22, beside being provided with an outer sheath of the latex bath material on the strand structure, is also provided with a thorough impregnation which acts to eliminate abrasive contact of adjacently disposed filaments.

The coated strand 27 is passed through the oven 25 and retained at a curing temperature sufficiently long to establish a set in the latex. A strand is passed through the oven 25 in a double path established by an upper pulley 26 and then withdrawn and redirectioned over a pulley 29. The temperature of the oven is raised to a level such that the coating material does not boil or is otherwise not erratically disturbed during curing. For example, the temperature of the oven may be maintained in the order of 250° F. for an oven length of 12 feet, while the speed of the strand through the oven is in the order of 100 feet per minute. The temperature for latex rubber material which will not generally effect a boiling of moisture therein and which thus will not cause bubbles in the coating due to such boiling is in the order of 250° F.

The cured strand 27 is then passed through a coating powder such as zinc stearate, corn-starch or talc which eliminates the tendency toward tackiness which otherwise frequently results in a sticking or blocking of the strand during twisting and winding. The powdered coating is applied to the strand 27 by vibrating an accumulation of the powder in the path of the strand as the strand moves linearly toward the twister 38. A mound 30 of the powder coating is provided on an oscillating table surface 31 driven by an eccentric drive 34 which vibrates the table surface 31 across the bed 32 in a direction lateral of the path of the strand 27. The strand upon passing through the oscillating mound 30 receives a coating of the powder to such a degree that it avoids the likelihood of sticking of the strand in the package formed in the twister 38.

Linear movement of the strand through the bath and oven, as well as through the coating mound 30 is effected by a pair of feed rolls 36 which also govern the rate of introduction of the coated strand 27 to the twister bobbin 33. The strand is supplied from the rolls 36 through a guide eye 38 above the rotating twister bobbin 33. The twist is imparted to the strand by its engagement with a rotating traveler ring which moves circumferentially about the ring rail 37 surrounding the bobbin 33. The product resulting is a twisted impregnated and coated strand in which the glass filaments are twisted within the cushion-like material forming the impregnating and sheathing matrix.

The combination of the individual tendency of both the glass filaments as well as the cushionable matrix material to untwist causes the composite structure to act in a sense as a wild yarn attempting to return to the original untwisted condition of the filaments as a group.

Figure 3:
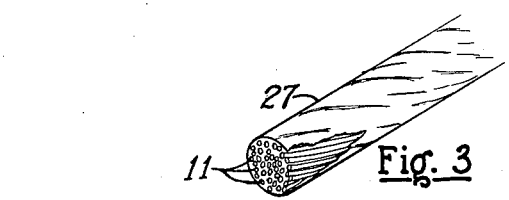
FIGURE 3 is a broken away cross-sectional and perspective view of a yarn structure of the present invention.

FIGURE 3 illustrates with greater clarity the structural arrangement of the continuous filaments 11 within the matrix of low modulus material. Extensibility is imparted to the structure by reason of the space between filaments 11 within the matrix. That is, upon application of lineal forces to the unitary structure 27, the twist in the filaments acts to impart a radially inward force so that the filaments displaceably squeeze the impregnated cushion material from between the filaments. In other words, because of the twist in the filaments, axial force components on the structure 27 act to contract the overall diameter of the group of filaments within the matrix, and correspondingly results in an extension of the total structure without actually stretching the glass filaments themselves. In this sense, the impregnant acts as a separator for the filaments, but a separator which is sufficiently mobile so that the filaments can be drawn closer together upon application of the lineal forces to the structure 27. As indicated above, the amount of twist in the individual composite structure 27, it has been found, is a factor determining the degree of extensibility. Twist translates the linearly applied forces to radially inward acting forces to squeeze the impregnant from between the filaments 11. The more the twist within the limits of non-looping the greater is the extensibility provided.

Examples of cushionable coating materials suitable for impregnation and coating of the strand structure of the present invention beside including rubber latices either of a natural or synthetic character such as acrylic, silicone, and fluorocarbon rubbers, also include copolymers of styrene and butadiene, copolymers of acrylonitryl butadiene, chlorinated polyethylene, polyvinyl chloride, and the polyamids.

High modulus filaments of materials such as glass, quartz, and other ceramic materials, as well as resin materials or specially processed natural fibrous materials such as regenerated cellulosic materials like Fortisan are adaptable for incorporation in the structure of this invention.

Figure 4:
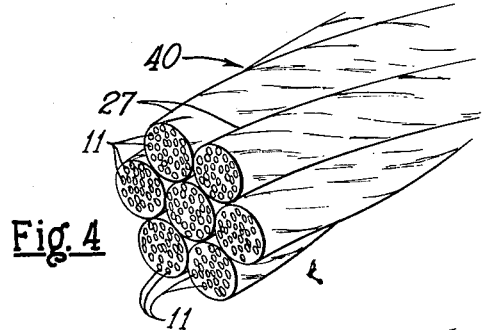
FIGURE 4 is a cross-sectional and perspective view of a plied yarn structure produced according to the principles of the present invention.

The concept of utilizing the cushion-like matrix material to provide extensibility in the composite structure 27 can be amplified by incorporating a plurality of the single strand structure 27 into a plied multiple strand structure like that shown in FIGURE 4. Extensibility is magnified in such a plied yarn structure since it utilizes the cushionability of the sheath of each individual strand structure 27 to promote extensibility in addition to the displaceability of the cushionable material from between filaments. That is, beside utilizing the individual extensibility of the single strands 27 to impart extensibility to the combination of such strands in a yarn 40, combination of two or more of the strands in an assembly structure such as a plied yarn provides a greater extensibility than is obtainable from a single strand structure by reason of the lateral displaceability of the sheaths of the strands beside the displaceability of material disposed between adjacent filaments when lineal forces are exerted on the assembly or combination structure.

When a force is exerted lineally on the structure shown in FIGURE 4, the sheaths of cushionable material on the strands 27 are so that they fill the spaces between the strands as well as being squeezed from between the strands when any such spaces are taken up. Thus, the total of the multiple groups of filaments 11 of the combination structure is in a sense contracted into a smaller space, while the matrix material of the individual strand structures 27 acquire a new orientation and the total yarn structure 40 becomes longer. The greater the space between filaments of the individual strands 27 and the greater the amount of sheathing material of cushionable character provided on the exterior of each strand 27 (and correspondingly the greater the spacing between the groups of filaments 11 provided by the sheaths), the greater is the extensibility of the plied yarn structure 40 in FIGURE 4.

By way of exemplification without intention to be limiting, the following are examples and data relative to functional improvements obtained by adaptation of the present strand product utilizing a rubber latex as a cushionable material to various textile assembly constructions as compared to similar constructions made of standard non-composite strand or yarn products:

Whereas an untwisted strand of 408 continuous glass fibers each having a normal diameter of .00038" provided a maximum of 2.5% elongation at its breaking load of 10 lbs. in tension, and a twisted strand provided an equivalent elongation at its breaking load of 9 lbs., a corresponding untwisted coated yarn construction made according to the present invention provided a 4% elongation at a breaking load of 14 lbs. while a similar construction with a twist of three turns per inch gave 4% elongation with only a 12.5 lb. load. Thus, the extensibility was increased approximately 60% and breaking load was increased 40% by adopting the principles of the present invention, while a twist in the construction reduced the loading required for the 4% elongation by 10.75%.

Figure 5:
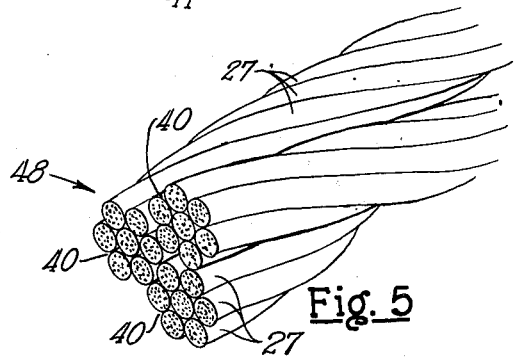
FIGURE 5 is a cross-sectional and perspective view of a cord type construction produced according to the principles of the present invention.

The concept of extensibility of the twisted filaments and cushionable matrix in a plied structure can be amplified still further in a cord or rope-type structure in view of the greater amount of contractability permissible by incorporation of the greater amount of cushionable material therein. As shown in FIGURE 5, a cord-type structure 48 can be made up of a plurality of structures 40 all assembled and plied together into the unitary construction with a multiplicity of vacant spaces between the basic composite structures 27 incorporated therein. Thus, upon exertion of longitudinal forces, the structure 48 has a capability of contraction percentage-wise to a much smaller diameter than a single strand or yarn component because of both the displaceability of the cushionable material between filaments as well as the take-up of the spaces between the structures 27.

Likewise, fabrics of such composite constructions can be imparted even greater extensibility because of their utilization of the greater extensibility of yarns over individual monofilament elements, such as elements 27, as well as added extensibility due to displaceability of contacting sheaths of the interwoven composite yarn constructions incorporated therein.

Where seven monofilaments of the present composite construction were each twisted with three turns per inch Z twist and plied into a product with a 9.0 twist, a 6.7% elongation was provided at a breaking load of 33 lbs.

A fabric constructed of composite yarn structures of the present invention provided a 9.2% extensibility at its breaking load, whereas the yarn structure alone had provided a 4.1% elongation at breaking load. A corresponding fabric of a standard non-composite glass fiber yarn construction provided only 1.8% extensibility with a 2.5% extensibility for the yarn construction alone.

Thus, extensibility of the glass fiber fabric was increased by approximately 400% upon incorporation of the principles and construction of the present invention.

The extensible composite structures of this invention have application for many purposes such as reinforcement of low compression modulus materials including V-belts, tires, fabrics of a conformable character, such as for convertible vehicle tops, upholstery, outdoor and indoor conveyor belts, hot material conveyor belts, high pressure hoses, and brake elements. Such composite structures are also adaptable to reinforcement of fuel cells, fish netting, carpet backing, and awnings.

While we have shown certain particular forms of our invention, it will be understood that many modifications may be made within the concept of the invention without deviating from the scope thereof. For example, a unitary strand structure of the type shown in FIGURE 3 may be plied into a yarn structure such as that of FIGURE 4 incorporating with the glass fiber strands, strands of different materials such as strands of natural fibers like cotton, or strands of other synthetic materials such as nylon and Dacron to still further enhance the capabilities of the composite structure. A conventional strand of glass fibers may also be plied with a unitary strand structure such as strand 27 of FIGURE 3, or a staple-type yarn structure may be plied with such a unit to advantage. Tests reveal that various modifications from standard practice such as a slight overtwist or a slight undertwist from a balanced condition in a plied construction also enhances strength and conditions of extensibility in the product produced. We therefore contemplate by the appended claims to cover all modifications which fall within the true spirit and scope of our invention.

We claim:

1. An extensible fibrous glass textile strand product comprising a group of continuous glass filaments, a set unitary substantially circular matrix of cushionable material for said entire group of filaments in which each of the filaments of said group is enclosed, said group of glass filaments and set matrix being spirally twisted to produce coacting untwisting forces in said matrix and filaments, said filaments being generally spaced from each other and said cushionable matrix material retaining the filaments in such spaced relation to amplify the coacting untwisting effectiveness of said cushionable material and filaments.

2. A textile product comprising a plurality of plied strand components plied together in generally balanced relation, said strand components each comprising a group of continuous glass filaments aligned in side-by-side relation, a unitary substantially circular matrix of cushionable material in set condition in which each of the fialments of said group is enclosed, said matrix including an outer layer of said cushionable material enclosing said filaments, said group of filaments and matrix in set condition being twisted spirally to produce coacting untwisting forces in said matrix and filaments, the filaments of said each strand component being retained in generally spaced relation from each other by said cushionable matrix material.

3. A textile product comprising a plurality of plied strand components, each of said strand components comprising a group of continuous glass filaments aligned in side-by-side relation, a unitary substantially circular matrix of cushionable material in set condition in which each of the filaments of said group is enclosed, said matrix including an outer sheathing layer for said group of enclosed filaments, said group of filamens and matrix in set condition being twisted spirally with said filaments being generally spaced from each other by said cushionable matrix material which retains the filaments in such spaced relation, said components being twisted in opposing directions and being plied together in substantially balanced relation.

4. A method for producing an extensible fibrous glass textile strand product comprising impregnating and coating with a low modulus cushionable material a fibrous glass strand of side-by-side parallel aligned continuous glass filaments, said impregnation being effected to the degree that the filaments are substantially separated by the impregnating cushionable material, curing said cushioning material to a set condition, with said filaments being retained in such separated relation, and providing an axial twist in said impregnated and coated strand to establish coacting untwisting forces in said matrix and filaments.

5. A method for producing an extensible fibrous glass textile strand product comprising impregnating and coating with a low modulus cushionable material a fibrous glass strand of side-by-side parallel aligned continuous glass filaments, said impregnation being effected to the degree that said filaments are substantially separated by the impregnating cushionble material, curing said cushioning material to a set condition, imparting an axial twist to said impregnated and coated strand, and plying said twisted strand with a similarly but oppositely twisted strand to a degree that the twist of the plied structure is substantially balanced.

6. A method for producing an extensible fibrous glass textile strand product comprising breaking down the interfilament bonded relation of a sized fibrous glass strand of continuous glass filaments, then impregnating said strand with a low modulus cushionable material, said impregnation being effected to the degree that said filaments are substantially separated by the impregnating cushionable material, curing said cushioning material to a set condition, and imparting an axial twist to said impregnated and coated strand.

7. A method for producing an extensible fibrous glass textile strand product comprising forming a plurality of continuous glass filaments, applying sizing material to each of said filaments, gathering said filaments into a common strand in which said filaments are aligned in parallel relation, breaking the sizing bonded relation between the filaments of said strand, impregnating said strand with a low modulus cushionable material, curing said cushioning material to a set condition, and then imparting an axial twist to said impregnated and coated strand.

References Cited in the file of this patent

UNITED STATES PATENTS

| | | |
|---|---|---|
| 2,133,238 | Slayter et al. | Oct. 11, 1938 |
| 2,770,940 | Morrison et al. | Nov. 20, 1956 |
| 2,775,860 | Morrison | Jan. 1, 1957 |
| 2,799,598 | Biefeld et al. | July 16, 1957 |
| 2,800,761 | Owens | July 30, 1957 |
| 2,842,932 | Owens | July 15, 1958 |
| 2,842,934 | Owens | July 15, 1958 |
| 2,903,779 | Owens | Sept. 15, 1959 |